June 16, 1931.  V. LINK  1,810,022
VEHICLE BRAKE
Filed Aug. 23, 1923
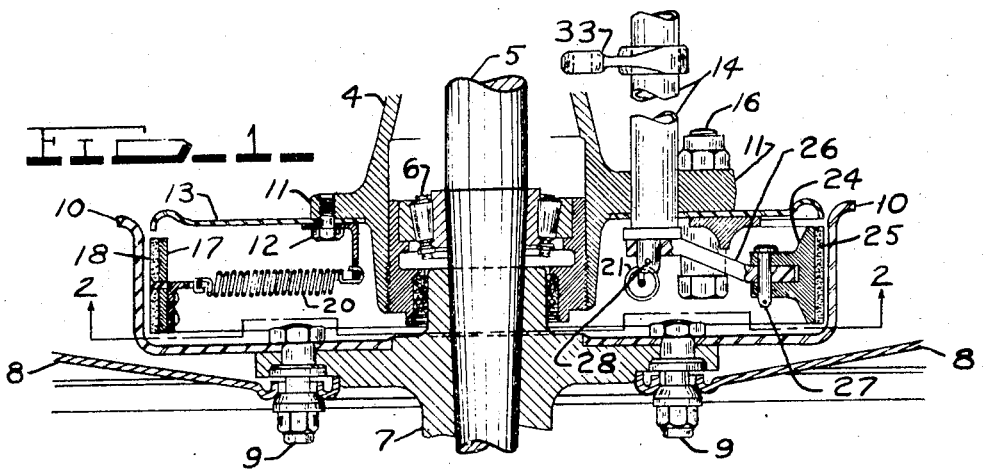
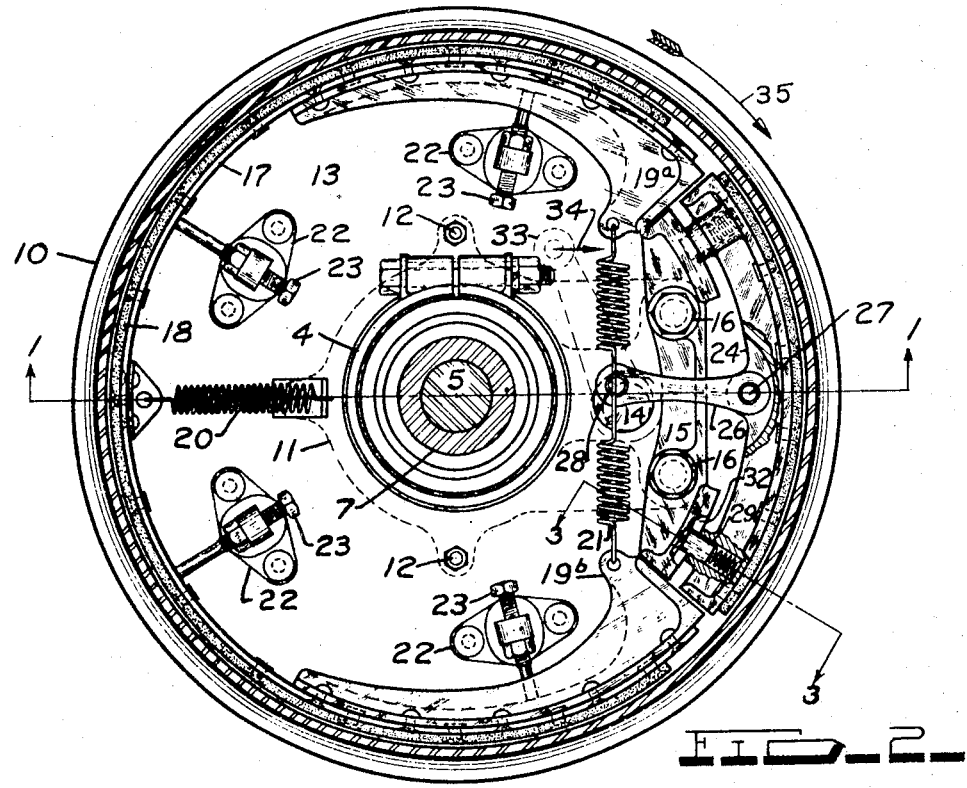
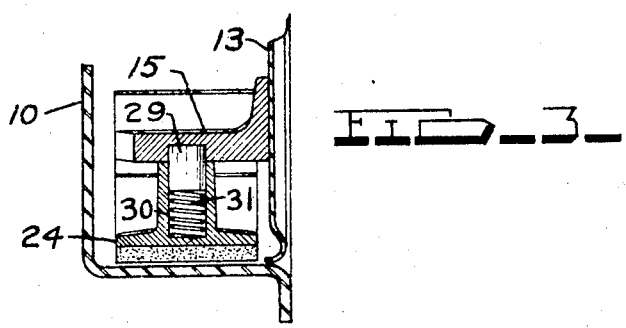
INVENTOR
*VINCENT LINK*
BY
ATTORNEY Patented June 16, 1931

1,810,022

UNITED STATES PATENT OFFICE

VINCENT LINK, OF DETROIT, MICHIGAN, ASSIGNOR TO THE STUDEBAKER CORPORATION, OF DETROIT, MICHIGAN, A CORPORATION OF NEW JERSEY

VEHICLE BRAKE

Application filed August 23, 1923. Serial No. 659,026.

This invention relates to brakes for vehicles and the like and has for its object the providing of such a brake that will utilize the movement of the vehicle for applying the same, that will require but little effort on the part of the operator to cause the same to be applied, that will need substantially no adjustment to compensate for wear.

A further object is to provide a brake wherein such a degree of clearance between the brake shoes or bands and the drum is possible and feasible that there is no danger of the shoes or bands dragging when the brake is in inoperative position, that will require practically no attention to keep the same in working order, that will particularly lend itself to use on vehicles wherein all the wheels are adapted to be braked, and that will be simple in construction, economical to manufacture, and effective in operation.

Further objects will be apparent in the following description, reference being had to the accompanying drawings which illustrates a suitable embodiment of my present invention, in which:

Figure 1 is a fragmentary horizontal section taken through the center of a vehicle axle and wheel having a brake embodying my present invention in connection therewith, said section being taken on a line corresponding to 1—1 of Figure 2.

Figure 2 is a side view of the mechanism of Figure 1 taken on the line 2—2 of Figure 1.

Figure 3 is a section taken on the line 3—3 of Figure 2.

Referring to the numbered parts of the drawings, 4 is a non-rotatable axle housing enclosing an axle 5, and a bearing 6 for the axle 5 is supported in the end thereof. A flanged member 7 is secured to the end of the axle 5 and a wheel 8, here shown as a disc wheel although any suitable type may be used, is secured thereto by the bolts 9. A brake-drum 10 is secured to the inner side of the flanged member 7 and arranged concentric to the axle 5. A flange 11 is provided near the end of the housing 4 to which is secured by the screws 12, a cover 13 for the open side of the drum 10.

The flange 11 formed on the axle housing 4 supports and forms a bearing for the shaft 14, and through it the braking effort applied to the wheel 8 is transmitted to the axle housing. Within the drum 10 a stop member 15 is secured by the bolts 16 to the flange 11. Arranged within the drum and spaced from its inner face is a brake band 17 faced with a friction material 18 and having brackets 19$^a$ and 19$^b$ secured adjacent its ends. As shown, the brake band 17 extends approximately around three-quarters of the circumference of the drum 10, it being held normally out of contact with the drum 10 by the coil spring 20 and 21, the brackets 19$^a$ and 19$^b$ abutting against the stop member 15, which prevents the band 17 from rotating with the drum 10 when it engages the same in the operation of applying a braking effort. Brackets 22 secured to cover 13 are provided with screws 23 for limiting the amount at the different points that the brake band 17 may withdraw away from the drum 10 when in inoperative position.

Between the open ends of the band 17, and between the stop member 15 and the adjacent portion of the drum 10, is a shoe member 24, faced with a friction material 25, and the surface of which is adapted to conform in shape with the inner face of the drum 10. A link 26 is pivotally connected to the shoe 24 by the pin 27, the other end being connected to the pin 28 which is formed on the end of the shaft 14 within the drum 10, and whose axis is eccentric with the axis of the shaft 14. Plungers 29 in openings 30 of the shoe 24 are pressed outwardly by springs 31 and are adapted to enter circumferential grooves 32 in the adjacent face of the stop member 15 in order that the shoe 24 will be held centrally with respect to the inner face of the drum 10 while being allowed movement in the direction of the circumference of the drum 10. The amount that the shoe 24 may withdraw away from the drum 10 is also limited by the adjacent face of the stop member 15, as clearly shown in Figure 3. Secured to the shaft 14 outside of the drum 10 is a lever 33, the end of which is connected to some suitable operating means such as the brake pedal of an automobile. When the end of the lever 33 is moved in the direction of the arrow 34, the eccentric pin 28 also moves in the same direction, causing the link 26 and shoe 24 to also move in that direction until the shoe 24 contacts with the drum 10. Reverse movement of the lever 33, in a similar manner, returns the mechanism to its original position.

In describing the operation of this brake I will assume that the wheel 8 and therefore the drum 10 is revolving in the direction of the arrow 35. Normally, the brake band 17 and brake shoe 24 is spaced from the drum as shown. When, however, it is desired to apply a braking action to the wheel 8, the lever 33 is moved in the direction of the arrow 34, causing the shoe 24 to engage the inner face of the drum 10. When the shoe 24 engages the drum 10, the latter tends to carry the shoe 24 around with it. The shoe 24 therefore moves with the drum until its forward end contacts with adjacent end of the bracket 19$^b$, tending to carry it around with the drum 10. Inasmuch as the bracket 19$^a$ on the other end of the brake band 17 is in contact with the stop 15 the brake band cannot rotate, but the pressure exerted by the shoe 24 on the end 19$^b$ moves the end 19$^b$ in the direction of rotation of the drum 10 an amount necessary to cause the band 17 to expand until the friction surface 18 engages with the drum 10 and tends to retard the drum's rotation. Degree of retardation of rotation may be varied by the force applied to the lever 33, by the driver of the vehicle and it is evident that the only force necessary for braking is that applied to the shoe 24. The movement of the vehicle of which the wheel 8 forms a part thereof, causes the brake pedal band 17, which exerts the main braking effort, to apply the braking effect. This materially reduces the pressure which must be applied to the brake pedal in order to slow down or stop the vehicle having such a brake, in comparison to vehicles wherein the pedal pressure must expand the whole brake band. In other words, this construction is of the "servo" type in which the movement of the vehicle acts to apply its own brakes. Inasmuch as the construction of the brake shown is symmetrical with respect to a line through its center, it is evident that it is equally effective in braking whether the drum is turning in one direction or another, a feature much desired but not widely found in the existing brakes now used on motor vehicles.

The brake in the drawing is what is known as the wrapping-band type, that is the band tends to wrap itself against the drum when placed in contact therewith. Such a construction is very effective in applying brakes but care must be exercised to prevent grabbing of the drum by the band. In my present invention as shown in the drawings I am able to control this feature by three different means. The first is by varying the length of the brake band 17 and the shoe 24. The second feature which not only prevents but which given a very desirable foot pedal action is the placing of the pin 28 between the axle 5 and the shoe 24. When the lever 33 is moved in the direction of the arrow 34, causing the shoe 24 to engage the drum 10, the shoe in moving with the drum 10 also draws away from it because of the shorter turning radius, and therefore eliminates any possibility of the shoe 24 sticking to the drum 10 and jamming the band 17 against the drum 10. Increased braking effort must be accompanied with increased movement of the lever 33 in order to keep the shoe 24 in contact with the drum 10. The third means employed to prevent grabbing of the brake band 17 is the application of pressure to the end of band 17 in a direction circumferential thereto, and in substantially the same circular path as that in which the brake band 17 lies. When the drum 10 is rotating and the shoe 24 is moved radially into contact therewith, the shoe 24 is carried around with the drum 10 in a direction circumferentially in respect thereto, and comes into contact with one of the brackets 19$^a$ or 19$^b$, depending upon which direction the drum 10 is rotating, substantially in the circular path of the brake band 17. The shoe 24 moves the end of the band 17 into contact with the drum 10 at a substantially flat angle and in such a manner that no localized point of high pressure occurs, with a result that the friction surface 18 on the band 17 engages the drum evenly and smoothly, and the band does not tend to grab the drum. Although I have shown the band type of brake herein it is evident that the band may be replaced by the conventional shoe construction and similar results obtained, and I do not restrict myself to the use of such a band.

In the prevailing types of brakes used at the present time it is necessary to have clearance between the brake drum and the brake band or shoes relatively small in order that a practical amount of pedal movement may be used and at the same time enough pressure be exerted to properly apply the brakes. This necessitates such a small clearance, in fact, that it is a common occurrence in brakes of the band type that the brake band drags on the drum when the brake is in inoperative position. Inasmuch as in the brake shown in the drawings, the only movement and pressure (which as has been explained is very light) necessary to apply the brakes is that necessary to move the shoe 24, the brake band 17 may be spaced at a relatively large distance from the drum 10 when in inoperative position, as the movement of the shoe 24 with the drum 10 will easily and effectively expand the brake with relatively little movement of the lever 33. This same feature is such as to obviate any necessity for adjusting the brake for wear until the friction facing 18 is worn to a point where replacement is necessary. Moreover, as the shoe 24 does not materially brake the drum 10 its friction facing 25 is not subject to the degree of wear that the friction facing 18 of the band 17 is subjected to and therefore requires little adjustment if any, which may be taken care of in the connection between the lever 33 and its operating point.

The feature of requiring but little pressure to effectively apply this brake, makes it especially adaptable for use in connection with vehicles in which all the wheels are braked In the usual mechanical four-wheel brakes now on the market, the pressure that must be applied to the brake pedal is invariably excessive, especially on larger vehicles, and the present construction when applied on all four wheels of a vehicle will provide a braking system with a much more rational pedal pressure.

Inasmuch as this construction constitutes a "servo" or self applying brake, self contained, it does not need the gearing, drum, and connections usually associated with "servo" brakes. In fact, very slight changes are necessary to change the conventional type of internal expanding brake to this construction, and therefore provides a very economical construction to manufacture.

Although in the drawings and foregoing description I have shown this device as a brake for a vehicle, it is evident that the same may be adapted for use in other places such as clutches and the like, and I do not limit myself to the specific embodiment of the invention described, the scope of which is commensurate with the appended claims.

What I claim is:

1. The combination with a rotatable wheel having a brake drum with a cylindrical surface thereon and a part stationary in relation thereto, of a non-continuous brake bend within said drum normally spaced from said cylindrical surface, brackets secured to said brake band adjacent its free ends, stops normally in engagement with both of said brackets, a friction shoe floating between said brackets and normally out of engagement with said cylindrical surface, an eccentric and a link pivotally connecting said shoe and said eccentric whereby movement of said eccentric causes said shoe to engage said cylindrical surface, said engagement causing said shoe to abut against one of said brackets and expand said brake bend into engagement with said cylindrical surface upon rotation of said wheel.

2. The combination with a rotatable wheel and a member stationary in respect thereto, a brake drum secured to said wheel, a flexible friction member positioned within and normally spaced from said drum, rigid members having contact surfaces thereon at the free ends of said friction member, stops secured to said stationary member adapted to engage said contact surfaces, a friction shoe positioned between said contact surfaces and normally out of contact with said drum, and means for causing engagement of said shoe with said drum, said engagement, when said drum is rotating, causing said shoe to be carried against one of said contact surfaces, moving the same in the direction of rotation of said drum, thereby expanding said friction member into engagement with said drum.

3. In combination with an axle and a wheel having a drum thereon, a non-continuous brake element within said drum, a friction shoe between the free ends of said brake element, stops normally in engagement with both free ends of said brake element for preventing rotation of said brake element with said drum, and means for causing said shoe to engage the cylindrical surface of said drum to move in the direction of rotation of said drum, said movement carrying said shoe against one of the free ends of said brake element and moving the same out of engagement with its respective stop, said last named movement causing said brake element to contact with said drum.

4. In a brake mechanism, in combination with a wheel and axle, a drum on said wheel and a support on said axle, of a non-continuous brake band within said drum normally spaced from the cylindrical surface of said drum, stops on said support, a friction shoe positioned within said drum normally spaced from the cylindrical surface of the same, said shoe being capable of movement circumferentially of said drum and to and from said drum, guides for said shoe, a shaft rotatably mounted on said support, an eccentric on said shaft, a link pivotally connecting said shoe to said eccentric, and means for imparting a rotative movement to said shaft to thereby move said friction shoe into and out of engagement with said drum.

5. In a device of the class described, the combination with a stationary part and a rotatable member provided with a cylindrical surface, of friction means movable to engage said cylindrical surface, a cam, and a friction shoe positioned between the ends of said friction means movable by said cam into engagement with said cylindrical surface and having circumferential movement in relation therewith, said friction shoe contacting with and acting on an end of said friction means to cause engagement of said friction means with said cylindrical means.

6. A brake mechanism comprising, a brake drum, retarding means therefor, and a driver-controlled member movable radially into engagement with said drum and then movable into engagement with said retarding means to move the latter into engagement with said drum.

7. In a brake mechanism, a rotatable drum, a free floating circular flexible brake element therein engageable therewith, and a second brake element movable radially and then circumferentially of said drum into engagement with said first brake element for applying pressure thereto in a direction circumferentially of said drum and substantially in the circular path thereof to expand said element into engagement with said drum.

8. In a brake mechanism, a rotatable drum, a free floating split circular flexible brake element within said drum engageable therewith, means movable radially relative to said drum positioned between the free ends of said element for applying pressure to an end of said element in a direction circumferentially of said drum and substantially in the circular path of said element, and a stop between the free ends of said brake element for taking the brake reaction on said element independently of said means.

9. In a brake mechanism, a rotatable drum, a non-continuous generally circular brake element positioned therein engageable therewith, and an independent member positioned between the free ends of said element initially movable into contact with the circular flange of said drum and then subsequently circumferentially movable into engagement with an end of said element to apply pressure thereto in a direction circumferentially of said drum and substantially in the circular path thereof.

10. In a brake mechanism, a rotatable drum, a free floating flexible brake band positioned therein engageable therewith, a brake shoe positioned between the free ends of said band, and means for moving said brake shoe radially into contact with said drum whereby said drum will carry said shoe in a circumferential path into direct contact with the end of said brake band to expand said brake band into contact with said drum.

11. In a brake mechanism, a rotatable drum, a pair of full floating brake elements positioned therein for engagement therewith, one of said elements being flexible and the other of said elements being non-flexible, means for initially moving said non-flexible element in a generally radial direction into contact with said drum whereby said drum will subsequently carry said non-flexible element circumferentially thereof into contact with said flexible element and expand said flexible element into contact with said drum, and stops engageable with the free ends of said flexible element adjacent the periphery of said drum for limiting circumferential movement thereof, said stops allowing said non-flexible element to move circumferentially therepast.

12. A brake comprising, in combination, a drum, a main brake element within said drum and engageable therewith, a servo brake shoe arranged at an end of said main brake element engageable with said drum, and means for forcing said servo brake shoe radially into contact with said drum and for causing said servo brake shoe to push said main brake element against said drum by direct contact therewith.

13. A brake comprising, in combination, a drum, main and servo brake elements disconnected from each other and both engageable with the same inner zone of the drum, and means for forcing said servo brake element outwardly into contact with said drum and permitting it to move with said drum into direct contact with said main brake element to engage the latter with said drum.

14. A brake comprising, in combination, a drum, a plurality of abutments spaced within the drum, a main brake element between the abutments and arranged to anchor thereon at its opposite ends when the drum is turning in opposite directions, and a servo shoe engageable with the same inner zone of the surface of the drum as the main brake element and directly engageable with said main brake element for pushing the main brake element into contact with the drum.

15. A brake comprising, in combination, a drum, a back plate therefor, friction means within the drum, a plurality of anchoring abutments carried by said back plate on at least part of which said means anchors when the brake is applied, and a servo shoe between said abutments and the cylindrical face of said drum having at each end a part projectable past the corresponding abutment to apply the friction means without engagement of the servo shoe with said abutment.

16. A brake comprising, in combination, a drum, friction means within the drum, a plurality of anchoring abutments on at least part of which said means anchors when the brake is applied, a servo shoe between two of the abutments having at each end a part projectable past the corresponding abutment to apply the friction means without engagement of the servo shoe with said abutment, and stops adjacent said abutments on which the adjacent ends of the servo shoe rests when the brake is not applied.

Signed by me at Detroit, Michigan, U. S. A., this 15th day of August, 1923.

VINCENT LINK.